(12) United States Patent
Hioda (10) Patent No.: US 10,773,674 B2
(45) Date of Patent: Sep. 15, 2020

(54) VEHICLE SEAT

(71) Applicant: TOYOTA JIDOSHA KABUSHIKI KAISHA, Toyota-shi, Aichi-ken (JP)

(72) Inventor: Seiji Hioda, Tokai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 65 days.

(21) Appl. No.: 16/176,468

(22) Filed: Oct. 31, 2018

(65) Prior Publication Data

US 2019/0176740 A1 Jun. 13, 2019

(30) Foreign Application Priority Data

Dec. 8, 2017 (JP) ................................ 2017-236137

(51) Int. Cl.
*B60R 21/207* (2006.01)
*B60N 2/22* (2006.01)
*B60N 2/42* (2006.01)
*B60R 21/2165* (2011.01)
*B60R 21/231* (2011.01)
(Continued)

(52) U.S. Cl.
CPC .......... *B60R 21/207* (2013.01); *B60N 2/2222* (2013.01); *B60N 2/4235* (2013.01); *B60R 21/217* (2013.01); *B60R 21/2165* (2013.01); *B60R 21/231* (2013.01); *B60N 2/42763* (2013.01); *B60R 2021/0006* (2013.01); *B60R 2021/2076* (2013.01); *B60R 2021/23146* (2013.01)

(58) Field of Classification Search
CPC .............. B60N 2/4235; B60N 2/42745; B60R 21/207; B60R 21/231
See application file for complete search history.

(56) References Cited

U.S. PATENT DOCUMENTS 5,799,971 A * 9/1998 Asada ................... B60R 21/207
280/728.3
5,893,579 A * 4/1999 Kimura ................ B60N 2/5825
280/728.3
(Continued)

FOREIGN PATENT DOCUMENTS

DE 102011056672 A1 * 6/2013 ........... B60R 21/207
JP 2015-009605 A 1/2015
(Continued)

OTHER PUBLICATIONS

Segedi et al., Vehicle seat for use in vehicle, particularly motor vehicle, has airbag module that is arranged between two structural sections, which are spanned to each-other in fan-shape by deployment of air bag, Jun. 20, 2013, EPO, DE 10 2011 056 672 A1, English Abstract (Year: 2013).*

(Continued)

*Primary Examiner* — James A English
(74) *Attorney, Agent, or Firm* — Oliff PLC (57) ABSTRACT

A vehicle seat includes a seat back including a movable portion that supports an occupant and moves in a vehicle width direction with respect to a main body frame due to a load in a seat width direction, a hard resin material that is provided at a left and right pair of side portions of the seat back and is capable of crushing deformation at a time of a vehicle side impact, and a seat cover that covers a surface of the hard resin material.

11 Claims, 9 Drawing Sheets

(51) Int. Cl.
  *B60R 21/217*  (2011.01)
  *B60N 2/427*  (2006.01)
  *B60R 21/00*  (2006.01)

(56) References Cited

U.S. PATENT DOCUMENTS

| | | | | |
|---|---|---|---|---|
| 5,988,674 | A * | 11/1999 | Kimura | B60R 21/207 |
| | | | | 280/728.3 |
| 6,450,528 | B1 * | 9/2002 | Suezawa | B60R 21/207 |
| | | | | 280/730.2 |
| 8,272,665 | B2 * | 9/2012 | Messina | B60R 21/207 |
| | | | | 280/728.2 |
| 8,602,449 | B2 * | 12/2013 | Kojima | B60R 21/207 |
| | | | | 280/730.2 |
| 2015/0061338 | A1 | 3/2015 | Nagayasu et al. | |
| 2015/0367756 | A1 * | 12/2015 | Katoh | B60N 2/643 |
| | | | | 297/285 |
| 2017/0008437 | A1 * | 1/2017 | Tanabe | B60N 2/4235 |
| 2017/0225640 | A1 * | 8/2017 | Ohno | B60R 21/207 |

FOREIGN PATENT DOCUMENTS

| | | |
|---|---|---|
| JP | 2015-047973 A | 3/2015 |
| JP | 2016-078668 A | 5/2016 |

OTHER PUBLICATIONS

Segedi et al., Vehicle seat for use in vehicle, particularly motor vehicle, has airbag module that is arranged between two structural sections, which are spanned to each-other in fan-shape by deployment of air bag, Jun. 20, 2013, EPO, DE 10 2011 056 672 A1, Machine Translation of Description (Year: 2013).*

* cited by examiner

VEHICLE SEAT

CROSS-REFERENCE TO RELATED APPLICATION

This application is based upon and claims the benefit of priority of the prior Japanese Patent Application No. 2017-236137, filed on Dec. 8, 2017, the entire contents of which are incorporated herein by reference.

FIELD

The embodiments discussed herein are related to a vehicle seat.

BACKGROUND

In Patent Document 1 (Japanese Patent Application Laid-Open (JP-A) No. 2016-078668), a vehicle seat including a seat back in which an elastic member is stretched between a left and right pair of side portions (for example, seat frame portions), in which a seat frame is covered with a soft pad material, such as foamed urethane or the like, and a seat cover, and in which a backing portion is configured by the elastic member, is disclosed. A side airbag device is accommodated at the side portion at the width direction outer side of the vehicle seat.

A structure in which a seat back movable portion that supports an upper body of an occupant is supported so as to be rotatable in a left-right direction bout an upper portion thereof is described in Patent Document 2 (Japanese Patent Application Laid-Open (JP-A) No. 2015-047973). Further, a structure in which a seating face support shape of a seat back pad is made to be changeable in accordance with a change in a support posture of a seated occupant is described in Patent Document 3 (Japanese Patent Application Laid-Open (JP-A) No. 2015-009605).

In the structure described in Patent Document 1 (Japanese Patent Application Laid-Open (JP-A) No. 2016-078668), even in a case in which a rotation force acts on an occupant at a time when a vehicle travels while turning, the occupant can be suitably supported due to a support face of the occupant moving according to expansion and contraction of the backing portion. However, in the structure described in Patent Document 1, since the occupant is supported by the backing portion at the time of a vehicle side impact, there is room for improvement in terms of increase in initial stage restraining performance for the occupant.

SUMMARY

In consideration of the aforementioned circumstances, an object of the present disclosure is to obtain a vehicle seat that can increase initial stage restraining performance for an occupant at the time of a vehicle side impact.

Means for Solving the Problem

A vehicle seat according to a first aspect includes a seat hack including a movable portion that supports an occupant and moves in a vehicle width direction with respect to a main body frame due to a load in a seat width direction, a hard resin material that is provided at a left and right pair of side portions of the seat back and is capable of crushing deformation at a time of a vehicle side impact, and a seat cover that covers a surface of the hard resin material.

According to the vehicle seat described in the first aspect, the movable portion that supports the occupant and moves in the vehicle width direction with respect to the main body frame due to a load in the seat width direction is provided at the seat back. As a result, even in a case in which a rotational force acts on the occupant at a time when the vehicle travels while turning, the occupant can be suitably supported due to the movable portion moving in the vehicle width direction with respect to the main body frame. Consequently, even when the hard resin material is provided at the side portions of the seat back, this does not have a significant effect on seating comfort.

Further, due to the hard resin material that is provided at the side portions of the seat back, an external force can be applied to the occupant from a vehicle side impact initial stage, and initial stage restraining performance for the occupant is increased. Furthermore, the hard resin material is configured to be capable of crushing deformation, and an energy absorption stroke can be enlarged due to the hard resin material being utilized as an energy absorbing material at the time of a side impact.

In a vehicle seat according to a second aspect, in the vehicle seat described in the first aspect, a side airbag device including a side airbag that inflates and deploys at the time of a vehicle side impact is accommodated at an interior of one or both of the side portions of the seat back, and at least a rear side of the side airbag device is covered by the hard resin material.

According to the vehicle seat described in the second aspect, inflation and deployment of the side airbag can be accelerated due to the hard resin material positioned at the rear side of the side airbag device being made to function as a reaction force plate at the time of inflation and deployment of the side airbag. Further, a webbing that stretches less easily than the seat cover for causing the side airbag to inflate and deploy quickly, that is to say, a webbing that surrounds the side airbag, or the like also becomes unnecessary.

In a vehicle seat according to a third aspect, in the vehicle seat described in the second aspect, the hard resin material includes an inner side resin-formed portion positioned at an occupant side and covering a periphery of the side airbag device, an outer side resin-formed portion positioned at a non-occupant side and covering the periphery of the side airbag device, a support portion that is formed at a portion of the inner side resin-formed portion and protrudes toward the occupant side to support the occupant, and a reaction force face that is formed at a portion of the outer side resin-formed portion, that covers a seat front-rear direction rear side of the side airbag device, and that generates a reaction force at a time of inflation and deployment of the side airbag.

According to the vehicle seat described in the third aspect, the periphery of the side airbag device is covered by the inner side resin-formed portion and the outer side resin-formed portion configured by the hard resin material. As a result, a retaining member, such as a packaging cloth or the like, that retains a folded-up shape of the side airbag becomes unnecessary, and a degree of freedom for folding-up of the side airbag is increased. Further, the support portion that protrudes toward the occupant side is formed at a portion of the inner side resin-formed portion, and restraining performance for the occupant at the side impact initial stage is more reliably increased by the support portion.

In a vehicle seat according to a fourth aspect, in the vehicle seat described in the third aspect, a tear portion at which a portion of the seat cover covering the inner side resin-formed portion and a portion of the seat cover covering the outer side resin-formed portion are overlapped with each other and sewn together is provided at a seat front-rear direction front of the side airbag device.

According to the vehicle seat described in the fourth aspect, by making the periphery of the tear portion the inner side resin-formed portion and the outer side resin-formed portion configured by the hard resin material, tension of the seat cover increases when the side airbag inflates and deploys, and it is possible to accelerate cleavage of the tear portion.

In a vehicle seat according to a fifth aspect, in the vehicle seat described in the third aspect, the movable portion is provided at a seat front-rear direction rear side of the support portion.

According to the vehicle seat described in the fifth aspect, the moveable portion that is capable of moving in the vehicle width direction is provided at the seat front-rear direction rear side of the support portion, and therefore, the movable portion can be concealed by the protruding support portion.

In a vehicle seat according to a sixth aspect, in the vehicle seat described in the third aspect, the inner side resin-formed portion and the outer side resin-formed portion are integrally connected with each other at the seat front-rear direction rear side of the side airbag device.

According to the vehicle seat described in the sixth aspect, the inner side resin-formed portion and the outer side resin-formed portion are integrally connected at the seat front-rear direction rear side of the side airbag device, and scattering of the hard resin material (that is to say, the inner side resin-formed portion and the outer side resin-formed portion) at the time of inflation and deployment of the side airbag can be prevented or suppressed. Further, due to the outer side resin-formed portion relatively moving in an opening direction about a connection portion with respect to the inner side resin-formed portion, the side airbag inflates and deploys along a movement direction of the outer side resin-formed portion, and stabilization of deployment behavior of the side airbag can be achieved.

In a vehicle seat according to a seventh aspect, in the vehicle seat described in the second aspect, the hard resin material is configured from a single resin-formed portion positioned at an occupant side of the side airbag device, and a tear portion at which a front end portion of the seat cover covering the resin-formed portion and a front end portion of the seat cover covering the side airbag device overlap with each other and are sewn together is provided at a seat front-rear direction front side portion of the resin-formed portion.

According to the vehicle seat described in the seventh aspect, due to the hard resin material being configured from a single resin-formed portion, the number of components can be reduced, and reduction in cost is possible.

In a vehicle seat according to an eighth aspect, in the vehicle seat described in the second aspect, the side airbag device and the hard resin material are pre-configured as a module by to a stud bolt attached to the side airbag device being inserted through an attachment hole that is formed at the hard resin material and by front end portions of the seat cover covering the hard resin material being sewn together.

According to the vehicle seat described in the eighth aspect, due to the side airbag device and the hard resin material being configured as a module in advance, assemblability of the side airbag device to the side portion of the seat back main body can be greatly improved.

In a vehicle seat according to a ninth aspect, in the vehicle seat described in the first aspect, the hard resin material includes at least one hollow portion that is formed in a hollow shape.

According to the vehicle seat described in the ninth aspect, the hard resin material is configured by at least one hollow portion that is formed in a hollow shape, and the hollow portion easily undergoes crushing deformation at the time of a vehicle side impact. As a result, the hard resin material can be utilized as an energy absorbing material according to a simple configuration.

In a vehicle seat according to a tenth aspect, in the vehicle seat described in the third aspect, the inner side resin-formed portion includes one hollow portion that is formed in a hollow shape, and the outer side resin-formed portion includes another hollow portion that is formed in a hollow shape.

According to the vehicle seat described in the tenth aspect, the inner side resin-formed portion is configured by the one hollow portion that is formed in a hollow shape, the outer side resin-formed portion is configured by the other hollow portion that is formed in a hollow shape, and the one hollow portion and the other hollow portion easily undergo crushing deformation at the time of a vehicle side impact. As a result, the inner side resin-formed portion and the outer side resin-formed portion can be utilized as an energy absorbing material according to a simple configuration.

According to the vehicle seat according to the present disclosure, initial stage restraining performance for the occupant at the time of a vehicle side impact can be increased.

DESCRIPTION OF EMBODIMENTS

Exemplary embodiments of the present disclosure will be explained in detail based on the drawings. It should be noted that, in these drawings, appropriately shown arrow FR indicates a vehicle front side, arrow UP indicates a vehicle upper side, and arrow OUT indicates a vehicle width direction outer side. Further, in the exemplary embodiments of the present disclosure, since a seat front direction, a seat width direction and a seat upward direction substantially correspond to a vehicle front direction, a vehicle width direction and a vehicle upward direction, respectively, these will be uniformly described as the vehicle front direction, the vehicle width direction and the vehicle upward direction.

First Exemplary Embodiment

A vehicle seat according to a first exemplary embodiment of the present disclosure will be explained with reference to FIG. 1 to FIG. 6. Further, since the respective drawings are schematic, illustration of that which has low relevance to the present disclosure is omitted.

(Configuration of Vehicle Seat)

Figure 1:
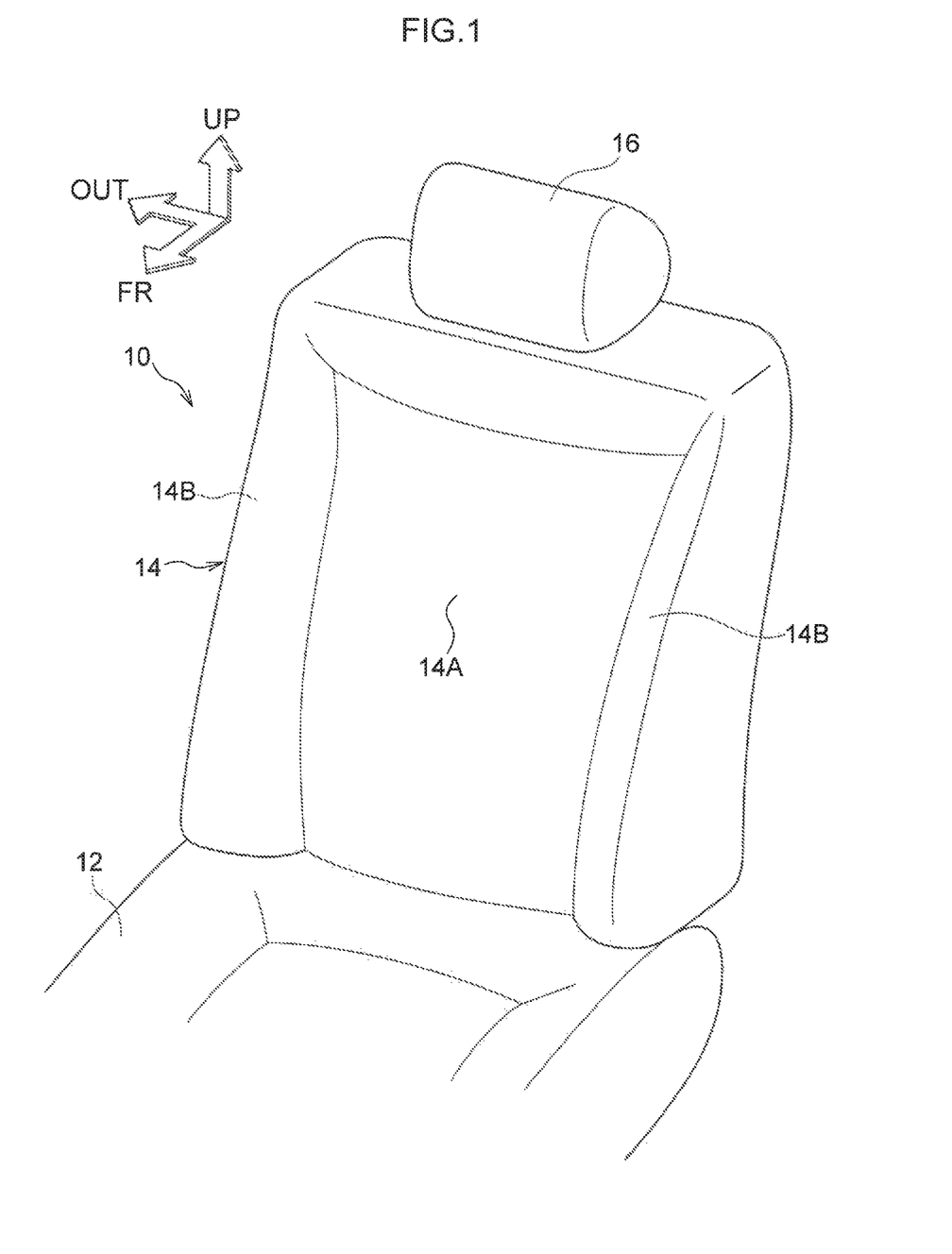
FIG. 1 is a schematic perspective view showing a seat back of a vehicle seat according to a first exemplary embodiment.

As shown in FIG. 1, a vehicle seat (hereinafter simply referred to as a "seat") 10 according to the first exemplary embodiment includes a seat cushion 12 on which an occupant sits, and a seat back 14 that supports a back portion of the occupant at a rear end portion of the seat cushion 12 (also refer to FIG. 2) A headrest 16 that supports a head portion of the occupant is attached to an upper end portion of the seat back 14.

In the first exemplary embodiment, the seat 10 is provided at a driver's seat side at a vehicle front seat right side (right side as seen from a vehicle rear side) of a cabin. It should be noted that the seat 10 is not limited to a case in which it is provided at the driver's seat side and can be applied as a seat other than a driver's seat, such as a passenger seat or the like.

Figure 2:
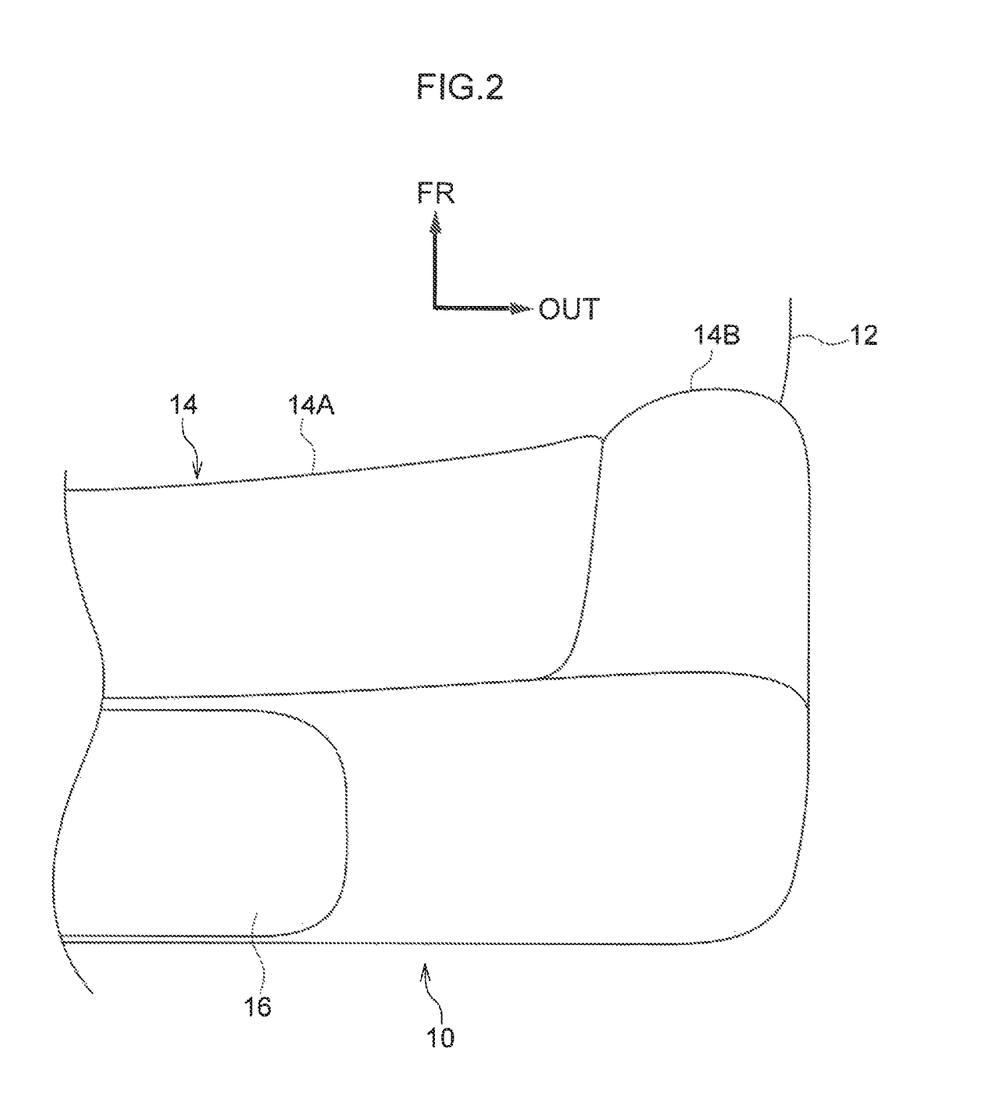
FIG. 2 is an enlarged plan view showing one side portion, in a seat width direction, of the seat back provided at the vehicle seat according to the first exemplary embodiment.

As shown in FIG. 1 and FIG. 2, the seat back 14 is configured with a shape in which a left and right pair of side portions 14B protrude to a vehicle front side with respect to a vehicle width direction (that is to say, seat width direction) central portion 14A. That is to say, the seat back 14 includes a left and right pair of side portions (for example, seat frame portions) 14B at both vehicle width direction end portions thereof.

Figure 3:
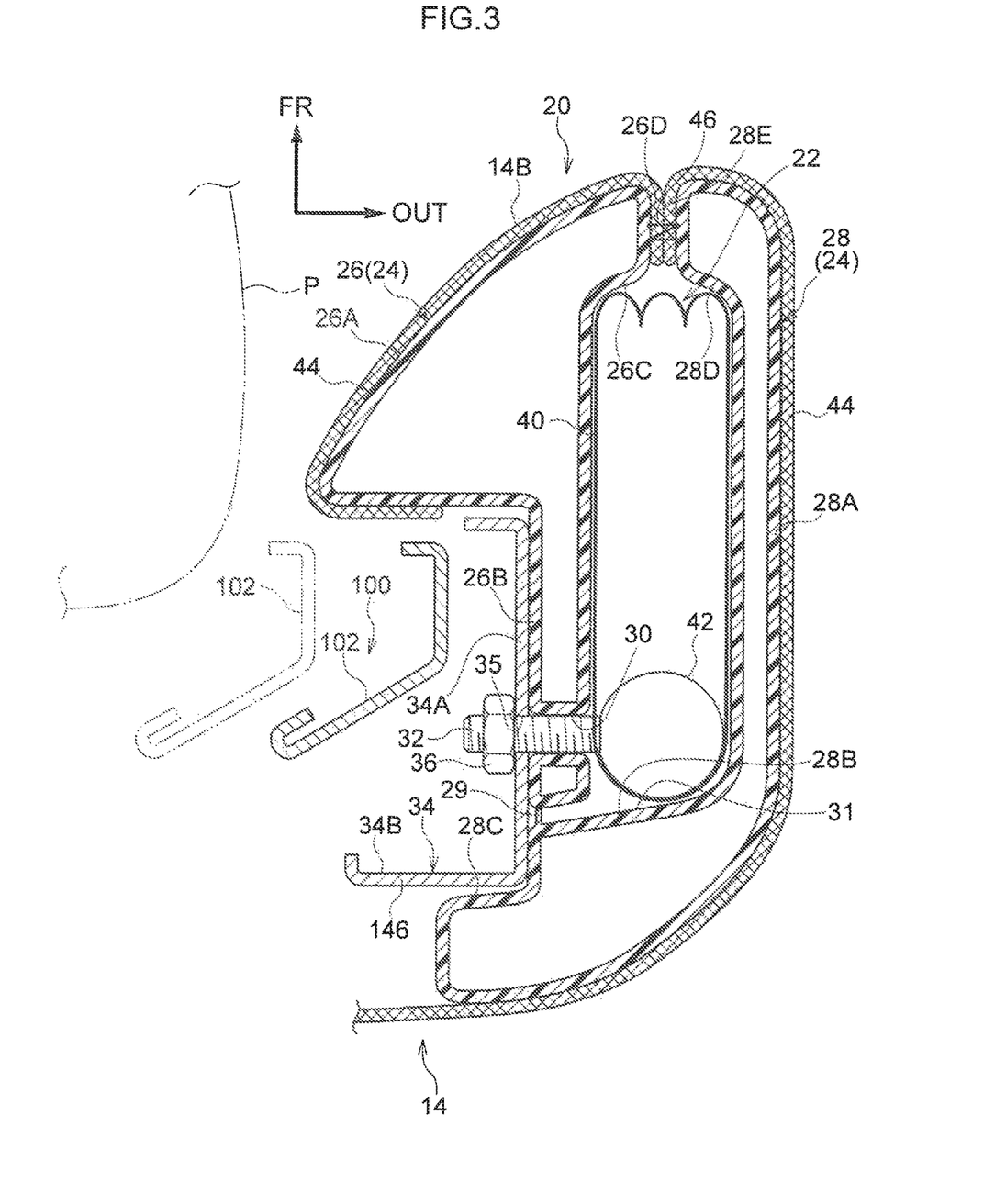
FIG. 3 is an enlarged cross-section view along the seat width direction, showing the one side portion of the seat back provided at the vehicle seat according to the first exemplary embodiment.

As shown in FIG. 3, an airbag unit (hereinafter referred to as a "unit") 20 into which a side airbag device 22, which will be described later, and the like is incorporated is provided at the side portion 14B of the seat back 14. It should be noted that, in FIG. 3, since both width direction end portions of the seat back 14 have left-right symmetry with each other, only a vehicle width direction right side end portion, as seen from the vehicle rear side, is illustrated, and illustration of a vehicle width direction left side end portion is omitted.

The unit 20 includes the side airbag device 22 accommodated at an interior thereof, and a hard resin material 24 that is disposed at a periphery of the side airbag device 22. The hard resin material 24 includes an inner side hollow portion 26 positioned at an occupant side (a vehicle width direction inner side in the first exemplary embodiment) covering the periphery of the side airbag device 22, and an outer side hollow portion 28 positioned at non-occupant side (a side opposite from the occupant, that is, a vehicle width direction outer side, in the first exemplary embodiment) covering the periphery of the side airbag device 22. In this regard, the inner side hollow portion 26 is one example of an inner side resin-formed portion, and the outer side hollow portion 28 is one example of an outer side resin-formed portion.

The inner side hollow portion 26 is formed in a hollow shape by a hard resin material and is configured so as to be capable of crushing deformation at the time of a side impact of the vehicle. The inner side hollow portion 26 is formed, for example, by blow molding. A support portion 26A that protrudes toward the occupant side (the vehicle width direction inner side in the first exemplary embodiment) to support an occupant P is formed at a vehicle front-rear direction front portion of the inner side hollow portion 26. Further, the inner side hollow portion 26 includes a vertical wall portion 26B that is disposed in substantially a vehicle front-rear direction and substantially a vehicle up-down direction at a vehicle front-rear direction rear portion side of the support portion 26A. An attachment hole 30 that penetrates the vertical wall portion 26B substantially along the vehicle width direction is provided at a rear portion of the vertical wall portion 26B, and a stud bolt 32 of an inflator 42, which will be described later, is inserted through the attachment hole 30. Further, the inner side hollow portion 26 includes, at a vehicle front-rear direction front portion thereof, a front side extending-out portion 26C that is extended out from e support portion 26A side so as to cover a vehicle width direction inner side portion at a front side of the side airbag device 22.

The outer side hollow portion 28 is formed in a hollow shape by the hard resin material and is configured so as to be capable of crushing deformation at the time of a side impact of the vehicle. The outer side hollow portion 28 is formed, for example, by blow molding. The outer side hollow portion 28 includes a main body portion 28A that is disposed in substantially the vehicle front-rear direction and substantially the vehicle up-down direction at an intermediate portion in the vehicle front-rear direction. Further, the outer side hollow portion 28 includes a rear side extending-out portion 28B that is extended out from a rear portion side of the main body portion 28A so as to cover a vehicle front-rear direction rear side of the side airbag device 22. The rear side extending-out portion 28B includes a front face 31 that is disposed in substantially the vehicle up-down direction and substantially the vehicle width direction at a vehicle front-rear direction front side, and the front face 31 faces a rear end portion of the side airbag device 22 in the vehicle front-rear direction. The front face 31 of the rear side extending-out portion 28B is one example of a reaction force face and functions as a reaction force face that generates a reaction force at a time of inflation and deployment of a bag body 40, which will be described later.

Further, the outer side hollow portion 28 includes, at a vehicle width direction inner side of the rear side extending-out portion 28B, a protrusion portion 28C that is disposed at a rear side of the main body frame 34, and that protrudes to the vehicle width direction inner side. Furthermore, the outer side hollow portion 28 includes, at a vehicle front-rear direction front portion thereof, a front side extending-out portion 28B that is extended out from the main body portion 28A side so as to cover a vehicle width direction outer side portion at a front side of the side airbag device 22. An inner side end face 28E of the front side extending-out portion 28D in the outer side hollow portion 28 is disposed so as to face an outer side end face 26D of the front side extending-out portion 26C in the inner side hollow portion 26.

A connection portion 29 that connects between an end portion at a vehicle width direction inner side and a vehicle front-rear direction rear side of the vertical wall portion 26B and a vehicle width direction inner side end portion of the rear side extending-out portion 28B is provided at the inner side hollow portion 26 and the outer side hollow portion 28. In other words, the inner side hollow portion 26 and the other side hollow portion 28 are integrally connected with each other by the connection portion 29 that is disposed at the vehicle front-rear direction rear side of the side airbag device 22. The connection portion 29 is disposed at the vehicle width direction inner side of the rear end portion of the side airbag device 22. The connection portion 29 is configured, for example, by an integral hinge that is formed integrally with the inner side hollow portion 26 and the outer side hollow portion 28.

The side airbag device 22 is disposed at a portion that is surrounded by the inner side hollow portion 26 and the outer side hollow portion 28. The side airbag device 22 includes the bag body 40 serving as a side airbag disposed at a vehicle front-rear direction front side thereof, and the inflator 42 disposed at a rear side of the bag body 40. The bag body 40 is disposed in a folded up state between the inner side hollow portion 26 and the outer side hollow portion 28. The inflator 42 is configured so as to eject a gas to an interior of the bag body 40 due to being activated, to inflate and deploy the bag body 40.

A seat cover 44 that covers a surface of the support portion 26A and a surface at a front portion side of the front side extending-out portion 26C is provided at the inner side hollow portion 26. Further, a seat cover 44 that covers a surface at a vehicle width direction outer side of the main body portion 28A, a surface at a front portion side of the front side extending-out portion 28D, and a surface at a rear portion side of the rear side extending-out portion 28B is provided at the outer side hollow portion 28.

An end portion of one seat cover 44 that covers the support portion 26A of the inner side hollow portion 26 is wrapped around so as to cover the vehicle width direction outer side end face 26D of the front side extending-out portion 26C. Further, an end portion of another seat cover 44 that covers the main body portion 28A of the outer side hollow portion 28 is wrapped around so as to cover the vehicle width direction inner side end face 28E of the front side extending-out portion 28D. Then, the end portion of the one seat cover 44 that covers the outer side end face 26D of the inner side hollow portion 26 and the end portion of the other seat cover 44 that covers the inner side end face 28E of the outer side hollow portion 28 are sewn together in a state in which they are overlapped (that is to say, superposed) with each other, whereby a tear portion 46 is provided. The tear portion 46 is provided at a vehicle front-rear direction front of the side airbag device 22. The tear portion 46 is configured so as to be cleaved at a time when the bag body 40 inflates and deploys.

The seat cover 44 is formed, for example, by a fabric into which fibers have been woven or a flexible resin. The seat cover 44 is, for example, attached to the surface of the inner side hollow portion 26 and the surface of the outer side hollow portion 28 by adhesion or the like.

Figure 6:
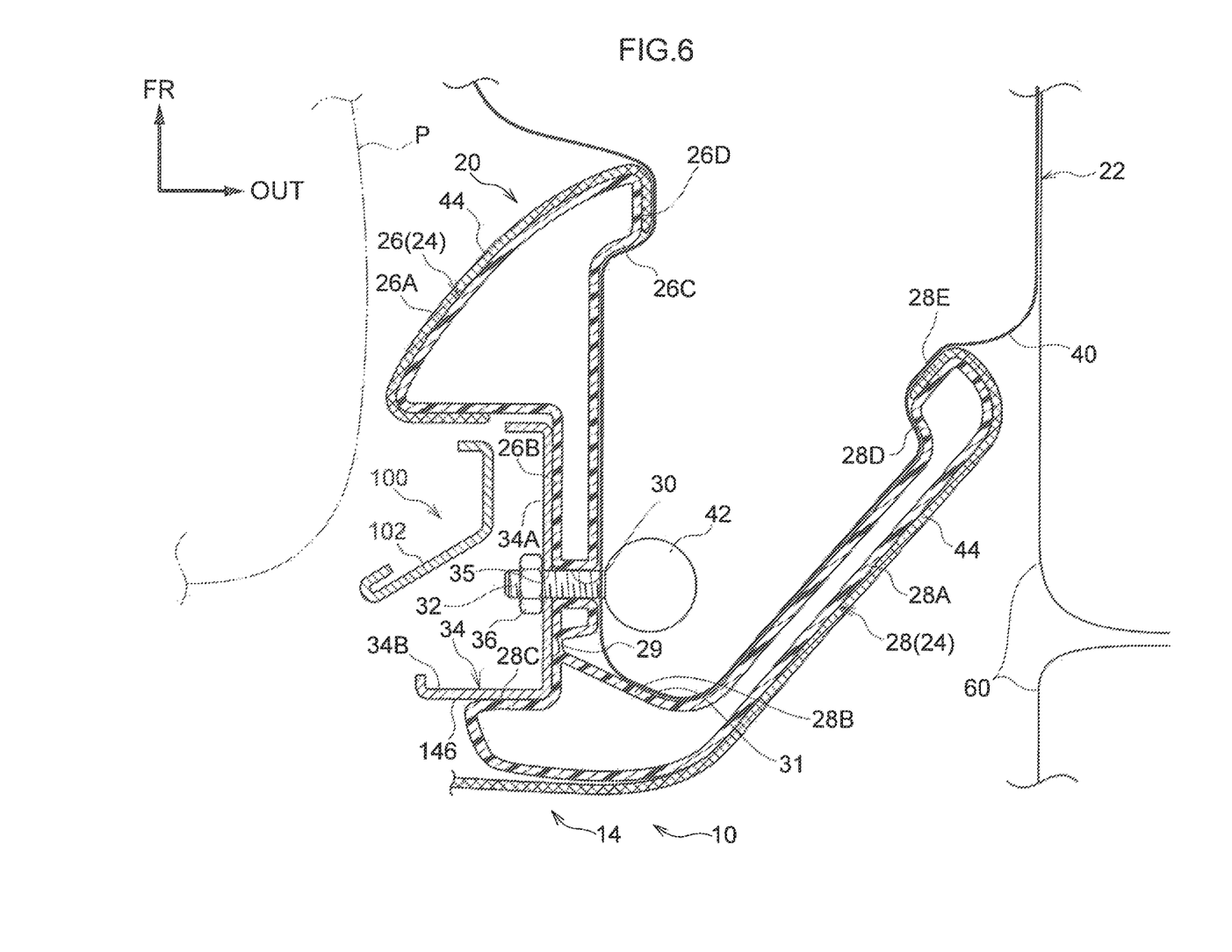
FIG. 6 is an enlarged cross-section view showing a state in which a bag body serving as an airbag provided at the side portion of the seat back of the vehicle seat according to the first exemplary embodiment has been inflated and deployed.

As shown in FIG. 6, at the time of a side impact of the vehicle, due to the bag body 40 of the side airbag device 22 inflating and deploying toward the vehicle front side, the rear side extending-out portion 28B rotates about the connection portion 29 with respect to the inner side hollow portion 26 so as to open at the vehicle width direction outer side, inside the vehicle cabin, a door trim 60 that is disposed in substantially the vehicle front-rear direction and substantially the vehicle up-down direction, with a gap between the seat back 14 and the door trim 60, is provided at a vehicle width direction outer side of the seat 10. The bag body 40 hits the door trim 60 and is inflated and deployed toward the vehicle front side.

Figure 4:
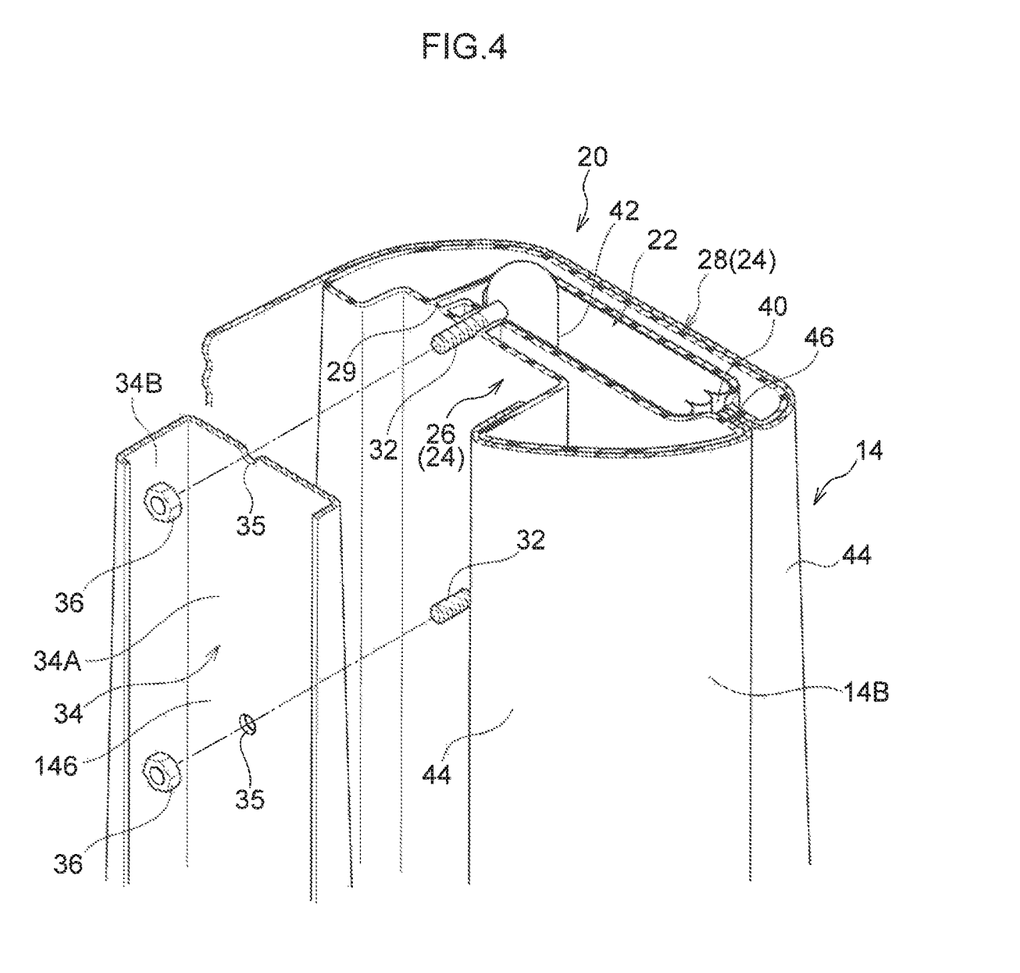
FIG. 4 is an exploded perspective view showing a state in which an airbag device and a hard resin material provided at the side portion of the seat back of the vehicle seat according to the first exemplary embodiment have been configured as a module.

As shown in FIG. 3 and FIG. 4, the main body frame 34 includes a side frame portion 146 that is disposed at a vehicle width direction outer side thereof. The side frame portion 146 is formed in a substantial L shape as viewed in a cross-section along the vehicle width direction. More concretely, the side frame portion 146 includes an outer side wall portion 34A that is disposed along substantially the vehicle front-rear direction and substantially the vehicle up-down direction, and an inner side wall portion 34B that extends from a vehicle front-rear direction rear end portion of the outer side wall portion 34A to the vehicle width direction inner side. A front end portion of the outer side wall portion 34A is bent toward the vehicle width direction inner side. A vehicle width direction inner side end portion of the inner side wall portion 34B is bent toward the vehicle front-rear direction front side. A through hole 35 through which the stud bolt 32 is inserted is formed at the outer side wall portion 34A.

One end portion of the stud bolt 32 is fastened to a wall portion at a vehicle width direction inner side of the inflator 42. A plurality of stud bolts 32 (for example, two) are provided in a vehicle up-down direction at the inflator 42. Another end portion side of the stud bolt 32 is inserted through the attachment hole 30 of the inner side hollow portion the through hole 35 of the main body frame 34. In this state, a nut 36 is fastened at the other end portion of the stud bolt 32, whereby the side airbag device 22, the hard resin material 24 (that is to say, the inner side hollow portion 26 and the outer side hollow portion 28) and the main body frame 34 are integrally assembled. That is to say, in the unit 20, due to the stud bolt 32 being inserted through the attachment hole 30 of the inner side hollow portion 26, and the seat cover 44 that covers the inner side hollow portion 26 and the seat cover 44 that covers the outer side hollow portion 28 being overlapped and sewn together at the tear portion 46, the side airbag device 22 and the hard resin material 24 (that is to say, the inner side hollow portion 26 and the outer side hollow portion 28) are configured as a module in advance.

As shown in FIG. 3, the main body frame 34 is fixed at the seat back 14. A movable frame 102 that supports the occupant P and that moves in the vehicle width direction with respect to the main body frame 34 due to a load in the vehicle width direction is provided at the seat back 14. The movable frame 102 configures a portion of a movable portion. The movable frame 102 is provided at a vehicle front-rear direction rear side of the support portion 26A of the inner side hollow portion 26.

Figure 5:
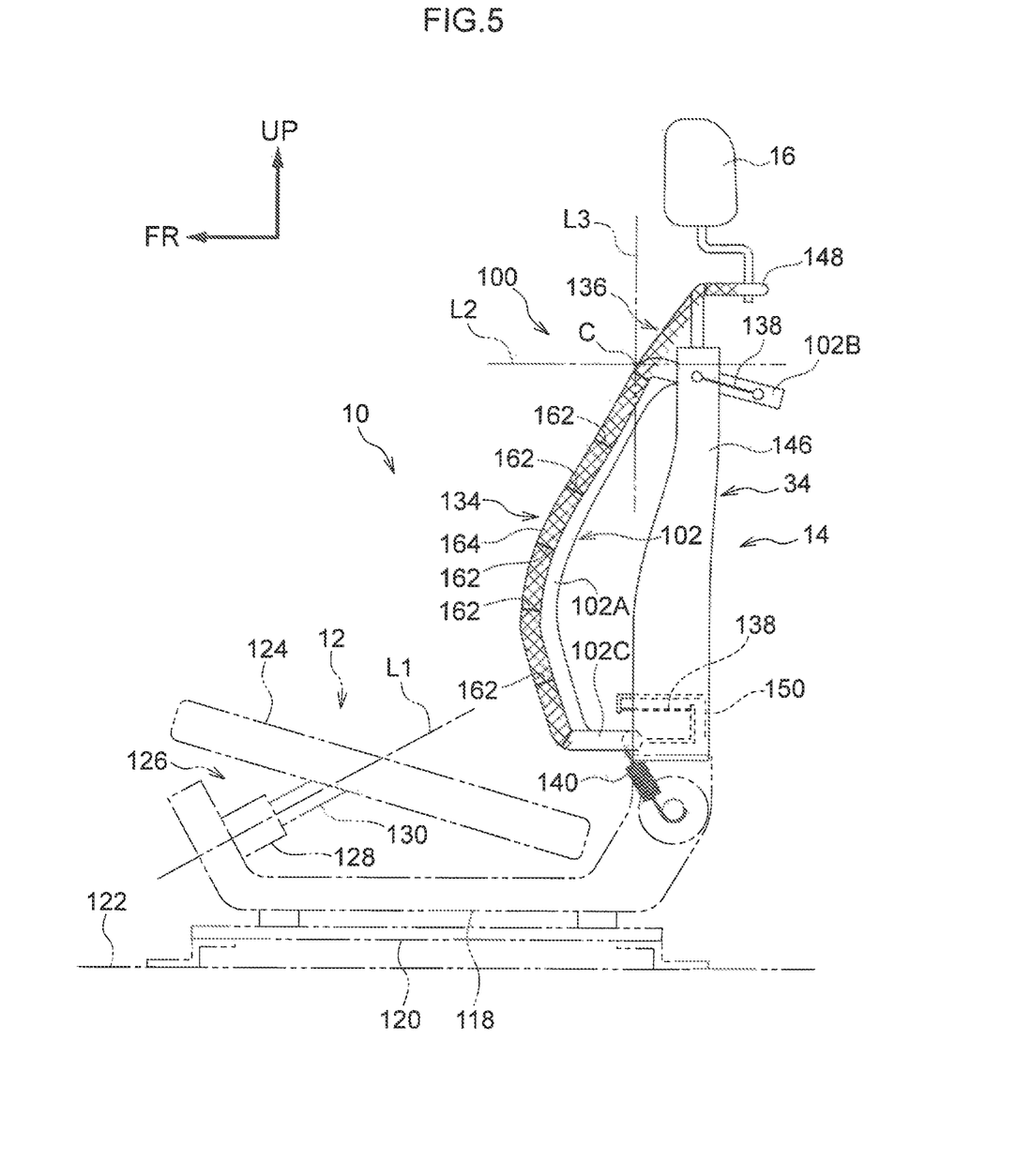
FIG. 5 is a side view showing a movable device that causes a movable portion provided at the vehicle seat according to the first exemplary embodiment to be movable.

FIG. 5 shows a movable device 100 that causes a backrest portion 134, serving as the movable portion including the movable frame 102, to be movable. First, the seat cushion 12 will be explained. As shown in FIG. 5, the seat cushion 12 includes a seat cushion frame 118. The seat cushion frame 118 is formed in a frame shape in planar view and is coupled to a floor 122 of a vehicle body via a left and right pair of slide rails 120. A seat portion 124 that supports a buttocks portion and a thigh portion of the occupant is disposed above the seat cushion frame 118. The seat portion 124 is coupled to (that is to say, supported at) the seat cushion frame 118 via a seat portion support mechanism 126 that is attached to a front end portion of the seat cushion frame 118.

The seat portion support mechanism 126 is a rotation mechanism including a shaft bearing 128 that is fixed at the seat cushion frame 118, and a rotation shaft 130 that is fixed at the seat portion 124 and is rotatably coupled to the shaft bearing 128. The rotation shaft 130 and the shaft bearing 128 are disposed such that respective axial directions thereof are inclined with respect to the vehicle front rear direction so as to be raised at the rear. A rotation axis L1 (refer to the imaginary line) of the seat portion 124 is inclined so as to be a rising slope toward the vehicle rear side and is set so as to pass through a vicinity of a lumbar portion of the occupant (omitted from the drawings) seated on the seat 10.

The seat back 14 includes the backrest portion 134 that supports the back portion of the occupant, a suspension portion (that is to say, a rotation coupling portion) 136 that couples the backrest portion 134 so as to be rotatable with respect to the main body frame 34, an outer periphery support portion 138 that couples a plurality of locations at an outer peripheral side of the backrest portion 134 to the main body frame 34, and an extension coil spring 140 that is bridged between a lower end portion of the backrest portion 134 and the seat cushion frame 118.

The main body frame 34 includes the side frame portions 146, which are disposed as a left and right pair, an upper frame portion 148 and a lower frame portion 150, and is formed in a frame shape as viewed in a front rear direction of the seat back 14. The side frame portions 146, the upper frame portion 148 and the lower frame portion 150 configure a framework of the seat back 14.

The backrest portion 134 is configured by the movable frame 102, and a plurality of lateral strand members 162 and a net-shaped member 164, which are elastic members. The movable frame 102 includes left and right side portions 102A, left and right upper portions 102B, and left and right lower portions 102C.

The plurality of lateral strand members 162 are strand-shaped members having flexibility and elasticity and are stretched along the seat width direction between the left and right side portions 102A. The net-shaped member 164 is a net-shaped member having flexibility and elasticity and is stretched along the seat width direction between the left and right side portions 102A similarly to the plurality of lateral strand members 162.

The suspension portion 136 is suspended from the main body frame 34 to support the backrest portion 134 and, although omitted from the drawings, is configured by a vertical strand portion and a lateral strand portion. The vertical strand portion extends in an up-down direction of the net-shaped member 164 and is coupled to the plurality of lateral strand members 162, and an upper end portion of the vertical strand portion is fixed at a seat width direction intermediate portion of the upper frame portion 148. A lower end portion of the vertical strand portion is fixed at the lower portions 102C of the movable frame 102. Further, the lateral strand portion is formed in a V shape as viewed from a seat back front side, and a seat width direction central portion of the lateral strand portion is fixed at a lateral strand member 162 that is disposed at an upper end portion of the backrest portion 134. Both end portions of the lateral strand portion are fixed at an upper portion of the upper frame portion 148.

The outer periphery support portion 138 is configured by a plurality of wires. Due to the outer periphery support portion 138, displacement of the backrest portion 134 toward the seat back rear side with respect to the main body frame 34 is regulated, and displacement thereof toward the seat back front side and the seat back width direction is restricted to within a predetermined range.

In the seat back 14 having the above-described configuration, the backrest portion 134 is supported via the outer periphery support portion 138 with respect to the main body frame 34. Further, the back portion of the occupant leaning against the seat back 14 is supported by the plurality of lateral strand members 162 and the net-shaped member 164 that are stretched at the moveable frame 102.

In the movable device 100, since the backrest portion 134 is suspended from the main body frame 34 via the suspension portion 136, the backrest portion 134 can rotate with respect to the main body frame 34 within a range in which the outer periphery support portion 138 bends, expands, contracts and the like. This rotation includes rotation (that is to say, swinging) toward the seat width direction around a rotation axis L2 (refer to the imaginary line) along the seat back front-rear direction, and rotation around a rotation axis L3 (refer to the imaginary line) along the seat back up-down direction. The aforementioned rotation toward the seat width direction is rotation toward a roll direction of the vehicle with an upper side fixed portion of the backrest portion 134 being a rotation center C. Further, the aforementioned rotation around the rotation axis along the seat back up-down direction is rotation toward a yaw direction of the vehicle with the upper side fixed portion of the backrest portion 134 being the rotation center C (regarding the movable device 100, refer to, for example, Japanese Patent Application Laid-Open (JP-A) No. 2016-005938).

(Operation and Effects)

Next, the operation and effects of the first exemplary embodiment will be explained.

In the seat back 14 having the above-described configuration, the backrest portion 134 moves (in the first exemplary embodiment, rotates) in the vehicle width direction with respect to the main body frame 34 due to a load in the seat width direction acting on the occupant P. As a result, even in a case in which a rotation force acts on the occupant P at a time when the vehicle travels while turning, the occupant P can be suitably supported due to the backrest portion 134 moving (in the first exemplary embodiment, rotating) in the vehicle width direction with respect to the main body frame 34. Consequently, in the above-described seat 10, even when the hard resin material 24 is provided at the side portions 14B of the seat back 14, this does not have a significant effect on seating comfort.

Further, due to the hard resin material 24 of the side portions 14B of the seat back 14, an external force can be applied to the occupant P from a vehicle side impact initial stage, and initial stage restraining performance for the occupant P is increased. Further, the inner side hollow portion 26 and the outer side hollow portion 28 configuring the hard resin material 24 undergo crushing deformation at the time of a side impact of the vehicle, thereby absorbing collision energy. Accordingly, in the above-described seat 10, an energy absorption stroke can be enlarged due to the hard resin material 24 being utilized as an energy absorbing material at the time of a side impact of the vehicle.

Further, in the above-described seat 10, the side airbag device 22 is accommodated at an interior of the side portion 14B of the seat back 14, and a periphery of the side airbag device 22 is covered by the inner side hollow portion 26 and the outer side hollow portion 28 configuring the hard resin material 24. Furthermore, the rear side of the side airbag device 22 is covered by the rear side extending-out portion 28B of the outer side hollow portion 28. When a side impact of the vehicle has been detected by a sensor (omitted from the drawings) provided at the vehicle, the inflator 42 activates to eject the gas to the interior of the bag body 40. At this time, a force is applied in a direction in which the inner side hollow portion 26 and the outer side hollow portion 28 relatively open, tension of the seat cover 44 increases, and the tear portion 46 is cleaved, whereby the bag body 40 is inflated and deployed. Accompanying the inflation and deployment of the bag body 40, the outer side hollow portion 28 rotates in the opening direction with respect to the inner side hollow portion 26 about the connection portion 29 (refer to FIG. 6).

In the above-described seat 10, since the rear side of the side airbag device 22 is covered by the rear side extending-out portion 28B of the outer side hollow portion 28, the front face 31 of the rear side extending-out portion 2813 positioned at the rear side of the side airbag device can be made to function as a reaction force plate at the time of inflation and deployment of the bag body 40. Consequently, inflation and deployment of the bag body 40 of the side airbag device 22 can be accelerated. Further, a webbing that stretches less easily than the seat cover 44 for causing the bag body 40 to inflate and deploy quickly (for example, a webbing that surrounds the bag body 40) or the like also becomes unnecessary.

In the above-described seat 10, since the periphery of the side airbag device 22 is covered by the inner side hollow portion 26 and the outer side hollow portion 28 configuring the hard resin material 24, a retaining member, such as a packaging cloth or the like, that retains a folded-up shape of the bag body 40 becomes unnecessary, and a degree of freedom for folding-up of the bag body 40 is increased. Further, since the support portion 26A that supports the occupant P is formed at the front portion of the inner side hollow portion 26, restraining performance for the occupant P at the side impact initial stage is more reliably increased.

In the above-described seat 10, the tear portion 46 at which the seat cover 44 covering the inner side hollow portion 26 and the seat cover 44 covering the outer side hollow portion 28 are overlapped with each other and sewn together is provided at the vehicle front-rear direction front of the side airbag device 22. As a result, by making the periphery of the tear portion 46 the inner side hollow portion 26 and the outer side hollow portion 28 configured by the hard resin material 24, tension of the seat cover 44 increases when the bag body 40 inflates and deploys, and it is possible to accelerate cleavage of the tear portion 46.

In the above-described seat 10, the movable frame 102 configuring a portion of the backrest portion 134 is disposed at a vehicle front-rear direction rear side of the support portion 26A of the inner side hollow portion 26. Consequently, the movable frame 102 that moves (in the first exemplary embodiment, rotates) in the vehicle width direction can be concealed by the support portion 26A of the inner side hollow portion 26.

In the above-described seat 10, the inner side hollow portion 26 and the outer side hollow portion 28 are integrally connected with each other by the connection portion 29 at the vehicle front-rear direction rear side of side airbag device 22. As a result, due to the outer side hollow portion 28 relatively moving in the opening direction with respect to the inner side hollow portion 26 about the connection portion 29 at the time of inflation and deployment of the bag body 40 (in the first exemplary embodiment, that which opens is mainly only the outer side hollow portion 28), scattering of the inner side hollow portion 26 and the outer side hollow portion 28 can be prevented or suppressed. Furthermore, due to the outer side hollow portion 28 relatively moving in the opening direction with respect to the inner side hollow portion 26 about the connection portion 29 at the time of inflation and deployment of the bag body 40, the bag body 40 inflates and deploys along the movement direction of the outer side hollow portion 28, and stabilization of deployment behavior of the bag body 40 can be achieved.

Further, in the above-described seat 10, the stud bolt 32 that is attached to the inflator 42 of the side airbag device 22 is inserted through the attachment hole 30 of the inner side hollow portion 26, and the front end portions of the seat cover 44 covering the inner side hollow portion 26 and the outer side hollow portion 28 are sewn together. As a result, the side airbag device 22 and the hard resin material 24 are configured as a module in advance. Consequently, assemblabilty of the side airbag device 22 and the hard resin material 24 to the side portion 14B of the seat back 14 can be greatly improved.

Furthermore, in the above-described seat 10, the hard resin material 24 includes the inner side hollow portion 26 that is formed in a hollow shape and the outer side hollow portion 28 that is formed in a hollow shape. As a result, the inner side hollow portion 26 and the outer side hollow portion 28 easily undergo crushing deformation at the time of a side impact of the vehicle. Consequently, the hard resin material 24 can be utilized as an energy absorbing material according to a simple configuration.

Second Exemplary Embodiment

Figure 7:
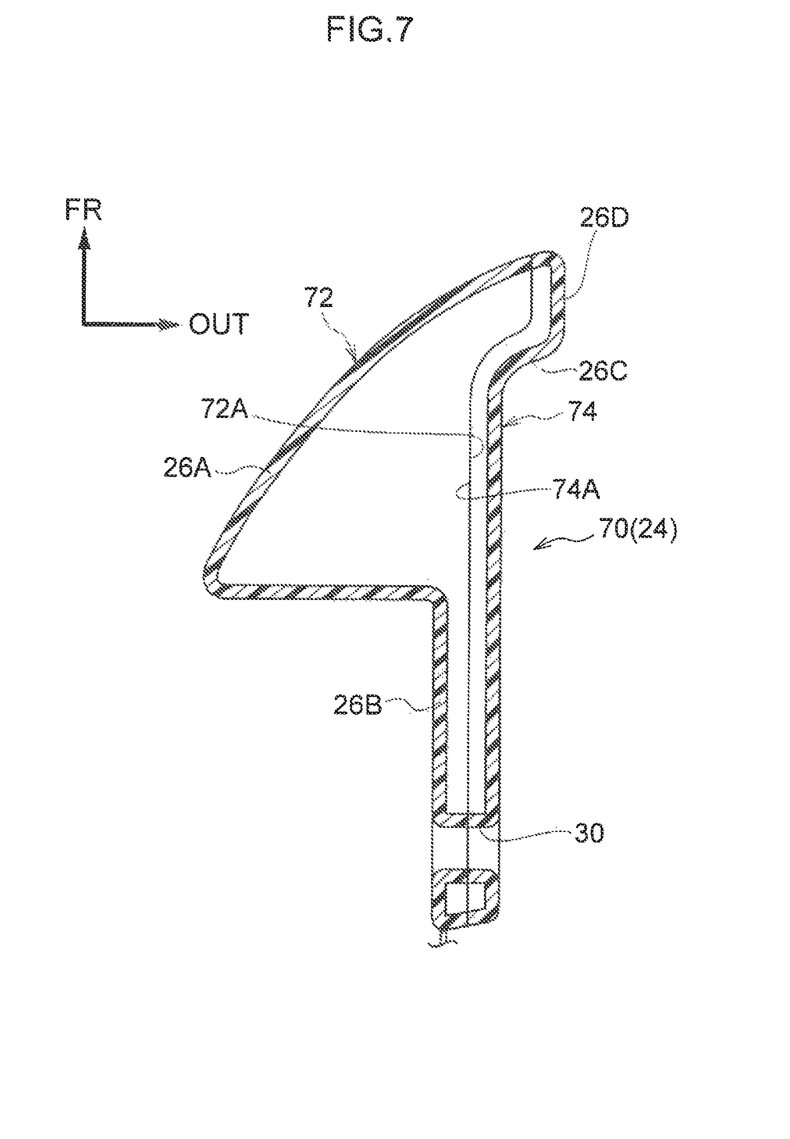
FIG. 7 is a cross-section view showing an inner side hollow portion of a hard resin material used in a seat back of a vehicle seat according to a second exemplary embodiment.

FIG. 7 shows an inner side hollow portion 70 serving as the inner side resin-formed portion of the hard resin material 24 that is used in a vehicle seat of a second exemplary embodiment. It should be noted that, for constituent portions that are the same as in the first exemplary embodiment described above, the same numbers are assigned thereto, and explanation thereof is omitted.

As shown in FIG. 7, the inner side hollow portion 70 includes an inner side resin portion 72 that is disposed at the vehicle width direction inner side, and an outer side resin portion 74 that is disposed at the vehicle width direction outer side. The inner side resin portion 72 is formed in a concave shape so as to open to the vehicle width direction outer side. Further, the outer side resin portion 74 is formed in a concave shape so as to open to the vehicle width direction inner side. The inner side resin portion 72 and the outer side resin portion 74 are, for example, formed separately by injection molding. The inner side hollow portion 70 is configured by two-ply coupling of the inner side resin portion 72 and the outer side resin portion 74. For example, the inner side hollow portion 70 is formed in a hollow shape by joining an outer side end face 72A of the inner side resin portion 72 and an inner side end face 74A of the outer side resin portion 74 by an adhesive, thermal welding or the like. The inner side hollow portion 70 has substantially the same shape as the inner side hollow portion 26 of the first exemplary embodiment.

In the above-described seat, an energy absorption stroke can be enlarged due to the inner side hollow portion 70 being utilized as an energy absorbing material at the time of a side impact of the vehicle. Further, since the inner side hollow portion 70 is configured by two-ply coupling of the inner side resin portion 72 and the outer side resin portion 74, manufacturing of the inner side hollow portion 70 is easy.

It should be noted that, although illustration is omitted from the drawings, the outer side hollow portion of the hard resin material 24 may also be provided with a configuration in which an inner side resin portion and an outer side resin portion are joined by two-ply coupling.

Third Exemplary Embodiment

Figure 8:
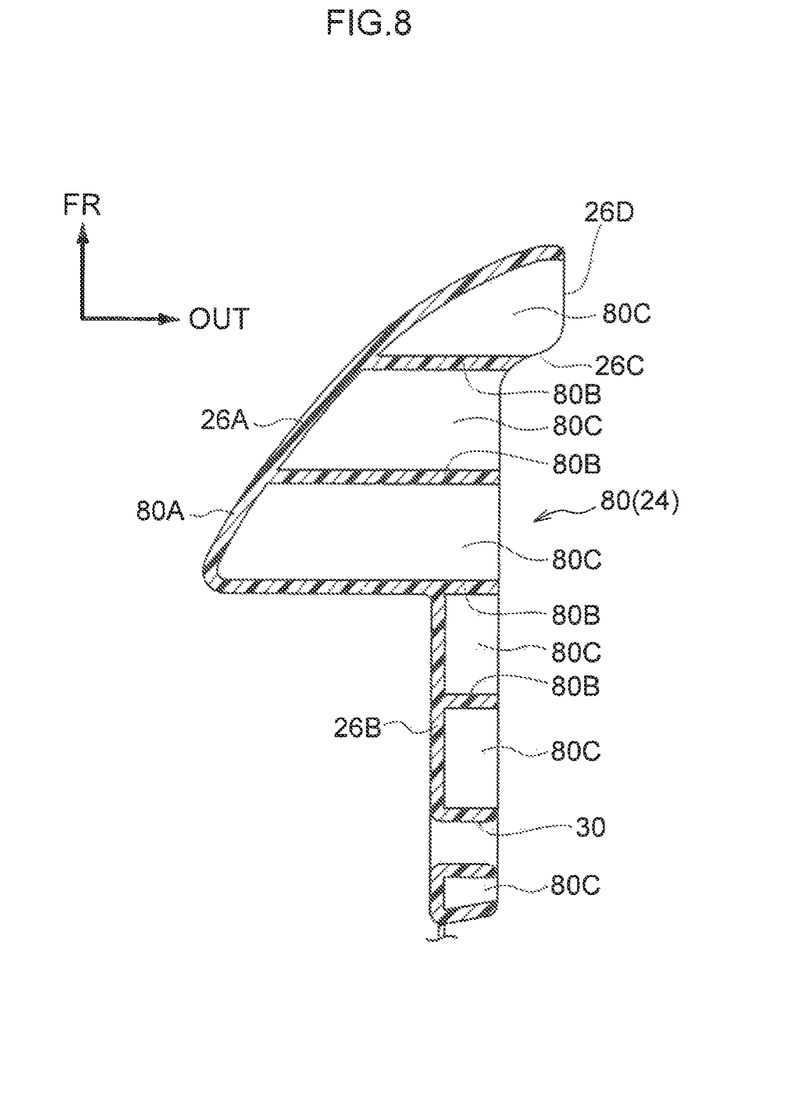
FIG. 8 is a cross-section view showing an inner side resin-formed portion of a hard resin material used in a seat back of a vehicle seat according to a third exemplary embodiment.

FIG. 8 shows an inner side resin formed portion 80 of the hard resin material 24 that is used in a vehicle seat of a third exemplary embodiment. It should be noted that, for constituent portions that are the same as in the first and second exemplary embodiments described above, the same numbers are assigned thereto, and explanation thereof is omitted.

As shown in FIG. 8, the inner side resin-formed portion 80 has an outer profile shape that is substantially the same as that of the inner side hollow portion 26 of the first exemplary embodiment but does not have a hollow shape. The inner side resin-formed portion 80 includes an inner side wall portion 80A configuring a face at a vehicle width direction inner side thereof. Furthermore, the inner side resin-formed portion 80 includes a plurality of ribs 80B extending substantially in the vehicle up-down direction from a face at a vehicle width direction outer side of the inner side wall portion 80A toward the vehicle width direction outer side, and a plurality of ribs 80C extending substantially in the vehicle front-rear direction from the face at the vehicle width direction outer side of the inner side wall portion 80A toward the vehicle width direction outer side. The plurality of ribs 80B and the plurality of ribs 80C are formed substantially in a lattice shape in a state of being viewed from the vehicle width direction outer side.

In the above-described seat, the pluralities of ribs 80B and ribs 80C of the inner side resin-formed portion 80 are configured to be capable of crushing deformation at the time of a side impact of the vehicle. Consequently, by utilizing the inner side resin-formed portion 80 as an energy absorbing material at the time of a side impact of the vehicle, an energy absorption amount can be made larger. Further, since the inner side resin-formed portion 80 includes the pluralities of ribs 80B and 80C at the face at the vehicle width direction outer side of the inner side wall portion 80A, manufacturing of the inner side resin-formed portion 80 is easy.

It should be noted that, although illustration is omitted from the drawings, the outer side resin-formed portion of the hard resin material 24 may also be provided with a configuration in which a plurality of ribs extend from an inner side face of an outer side wall portion thereof toward the vehicle width direction inner side.

Fourth Exemplary Embodiment

Figure 9:
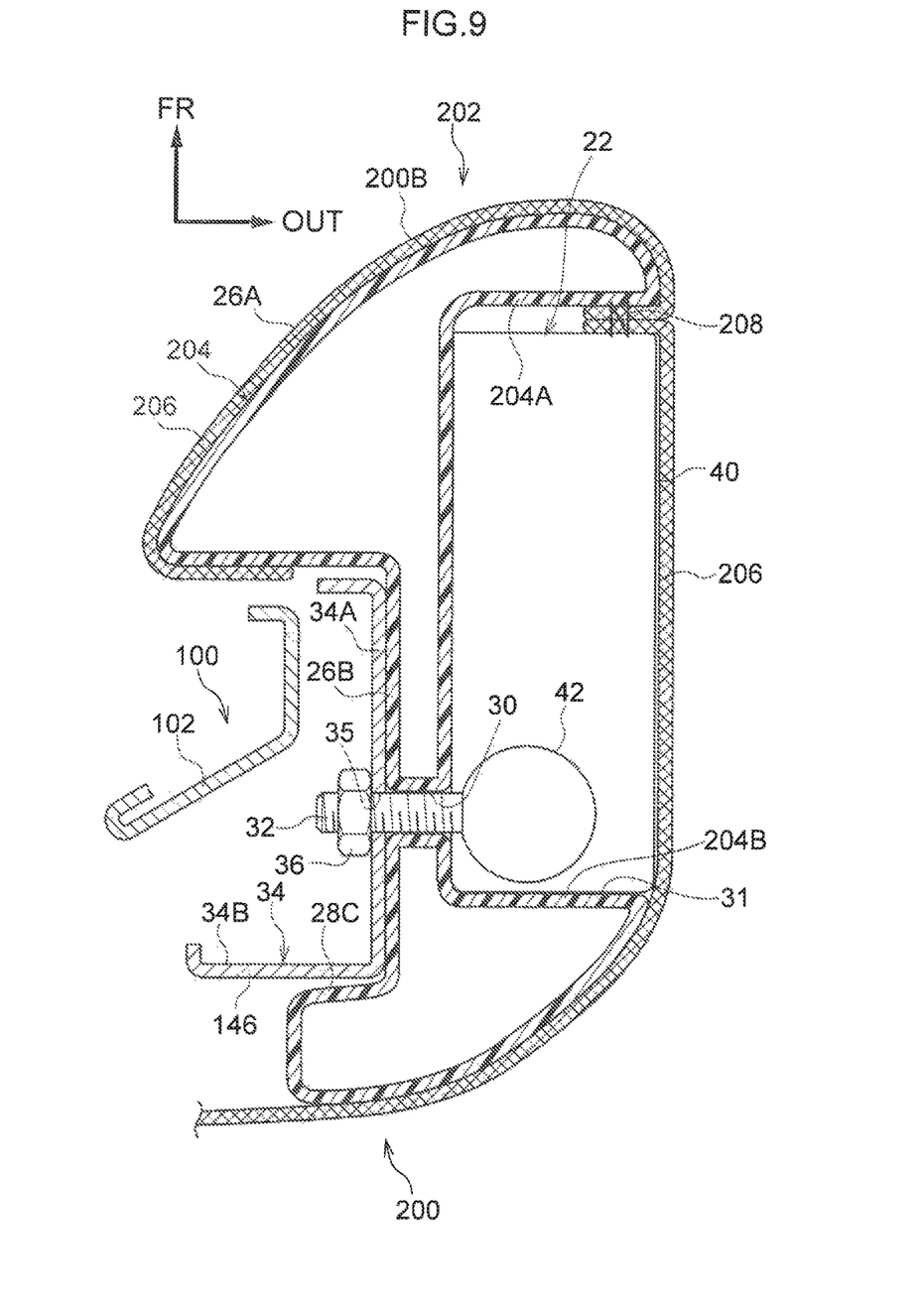
FIG. 9 is an enlarged cross-section view along a seat width direction, showing one side portion of a seat back of a vehicle seat according to a fourth exemplary embodiment.

FIG. 9 shows a side portion (for example, a seat frame portion) 200B of a seat back 200 of a seat (that is to say, a vehicle seat) of a fourth exemplary embodiment. It should be noted that, for constituent portions that are the same as in the first through third exemplary embodiments described above, the same numbers are assigned thereto, and explanation thereof is omitted.

As shown in FIG. 9, an airbag unit (hereinafter referred to as a "unit") 202 into which the side airbag device 22 and the like is incorporated is provided at the side portion 20013 of the seat back 200. The unit 202 includes the side airbag device 22 and a hard resin material 204 that is disposed so as to cover a vehicle width direction inner side, a vehicle front-rear direction front side and a vehicle front-rear direction rear side of the side airbag device 22. The hard resin material 204 is configured as a hollow portion that is formed in a hollow shape by a hard resin material and is configured to be capable of crushing deformation at the time of a side impact of the vehicle. The hard resin material 204 is formed, for example, by blow molding.

The hard resin material 204 includes a front side extending-out portion 204A that is extended out so as to cover the front end portion of the side airbag device 22, at a vehicle front-rear direction front portion of the support portion 26A.

Further, the hard resin material 204 includes a rear side extending-out portion 204B that is extended out so as to cover the rear end portion of the side airbag device 22, at a vehicle front-rear direction rear portion of the vertical wall portion 26B. The front face 31 of the rear side extending-out portion 204B functions as a reaction force face that generates a reaction force at the time of inflation and deployment of the bag body 40.

One seat cover 206 that covers the surface of the support portion 26A and a surface of a front portion of the front side extending-out portion 204A is provided at the hard resin material 204. An end portion of the one seat cover 206 is wrapped around so as to cover a portion of a surface at a rear side of the front side extending-out portion 204A. Further, another seat cover 206 is provided so as to cover a surface of a rear portion of the rear side extending-out portion 204B of the hard resin material 204 and a face at a vehicle width direction outer side of the side airbag device 22. An end portion of the other seat cover 206 is wrapped around so as to cover a portion of the front side of the side airbag device 22. Then, the end portion of the one seat cover 206 and the end portion of the other seat cover 206 are sewn together in a state in which they are overlapped (that is to say, superposed) with each other, whereby a tear portion 208 is provided. The tear portion 208 is provided at the vehicle front-rear direction front of the side airbag device 22 and is configured so as to be cleaved at a time when the bag body 40 inflates and deploys.

In the above-described seat, due to the hard resin material 204 of the side portion 200B of the seat back 200, an external force can be applied to the occupant (omitted from the drawings) from a vehicle side impact initial stage, and initial stage restraining performance for the occupant is increased. Further, the hard resin material 204 is configured by a hollow portion that is formed in a hollow shape and undergoes crushing deformation at the time of a side impact of the vehicle. Consequently, an energy absorption stroke can be enlarged due to the hard resin material 204 being utilized as an energy absorbing material at the time of a side impact of the vehicle.

Furthermore, in the above-described seat, as effects that are achieved due to the configuration thereof that is different from that of the seat 10 of the first exemplary embodiment, there are the following effects.

The hard resin material 204 is configured by a single hollow portion that is positioned at the occupant side of the side airbag device 22. Consequently, in the above-described seat, the number of components can be reduced, and reduction in cost is possible. Further, the hard resin material 204 is configured by the single hollow portion, and thus, the hard resin material 204 easily undergoes crushing deformation at the time of a side impact of the vehicle. As a result, the hard resin material 204 can be utilized as an energy absorbing material according to a simple configuration.

It should be noted that, in the first through fourth exemplary embodiments, it is possible for the sizes and shapes of the hard resin materials 24 and 204 to be modified. Further, in the third exemplary embodiment, it is possible for the arrangement of the plurality of ribs of the inner side resin-formed portion 80 to be modified.

Further, in the first exemplary embodiment, although the rear side extending-out portion 28B including the front face 31 serving as a reaction force face covering the seat front-rear direction rear side of the side airbag device 22 is provided at the outer side hollow portion 28 serving as the outer side resin-formed portion, the present disclosure is not limited to this configuration. For example, a reaction force face covering the seat front-rear direction rear side of the side airbag device 22 may be formed at the inner side resin-formed portion.

Further, in the first through fourth exemplary embodiments, the configuration of the backrest portion 134 including the movable frame 102 that moves in the vehicle width direction with respect to the main body frame 34 is not limited to the configuration shown in FIG. 5, and modification thereof is possible. Further, in the first through fourth exemplary embodiments, although the backrest portion 134 including the movable frame 102 is a configuration that rotates substantially in the vehicle width direction, the present disclosure is not limited to this configuration, and the backrest portion including the movable frame may be a configuration that moves substantially in the vehicle width direction.

It should be noted that, although specific exemplary embodiments of the present disclosure have been described in detail, the present disclosure is not to be limited to the present exemplary embodiments, and it will be clear to those skilled in the art that a variety of other embodiments are possible within the scope of the present disclosure.

The disclosures of Japanese Patent Application No. 2017-238137 filed on Dec. 8, 2017 are incorporated into the present specification by reference in their entirety.

All documents, patent applications and technical standards cited in the present specification are incorporated by reference into the present specification to the same extent as if the individual documents, patent applications and technical standards were specifically and individually recited as being incorporated by reference.

What is claimed is:

1. A vehicle seat comprising:
a seat back comprising a movable frame that supports an occupant, and that moves in a vehicle width direction with respect to a main body frame due to a load in a seat width direction when a rotation force acts on the occupant due to a vehicle traveling by turning;
a hard resin material that is provided at a left and right pair of side portions of the seat back, and that is capable of crushing deformation at a time of a vehicle side impact; and
a seat cover that covers a surface of the hard resin material; and
a side airbag device comprising a side airbag that inflates and deploys at the time of a vehicle side impact and accommodated at an interior of one or both of the side portions of the seat back; wherein
at least a rear side of the side airbag device is covered by the hard resin material.

2. A vehicle seat comprising:
a seat back comprising a movable portion that supports an occupant, and that moves in a vehicle width direction with respect to a main body frame due to a load in a seat width direction;
a hard resin material that is provided at a left and right pair of side portions of the seat back, and that is capable of crushing deformation at a time of a vehicle side impact; and
a seat cover that covers a surface of the hard resin material;
a side airbag device comprising a side airbag that inflates and deploys at the time of a vehicle side impact and accommodated at an interior of one or both of the side portions of the seat back; wherein
at least a rear side of the side airbag device is covered by the hard resin material, and the hard resin material comprises:
an inner side resin-formed portion positioned at an occupant side and covering a periphery of the side airbag device;
an outer side resin-formed portion positioned at a non-occupant side and covering the periphery of the side airbag device;
a support portion that is formed at a portion of the inner side resin-formed portion and that protrudes toward the occupant side to support the occupant; and
a reaction force face that is formed at a portion of the outer side resin-formed portion, that covers a seat front-rear direction rear side of the side airbag device, and that generates a reaction force at a time of inflation and deployment of the side airbag.

3. The vehicle seat according to claim 2, wherein a tear portion, at which a portion of the seat cover covering the inner side resin-formed portion and a portion of the seat cover covering the outer side resin-formed portion overlap with each other and are sewn together, is provided at a seat front-rear direction front of the side airbag device.

4. The vehicle seat according to claim 2, wherein the movable portion is provided at a seat front-rear direction rear side of the support portion.

5. The vehicle seat according to claim 2, wherein the inner side resin-formed portion and the outer side resin-formed portion are integrally connected with each other at the seat front-rear direction rear side of the side airbag device.

6. The vehicle seat according to claim 5, wherein the connection portion in which the inner side resin-formed portion and the outer side resin-formed portion are integrally connected to each other is formed of an integral hinge.

7. The vehicle seat according to claim 2, wherein the hard resin material includes at least one hollow portion that is formed in a hollow shape.

8. The vehicle seat according to claim 2, wherein:
the inner side resin-formed portion includes one hollow portion that is formed in a hollow shape; and
the outer side resin-formed portion includes another hollow portion that is formed in a hollow shape.

9. The vehicle seat according to claim 8, wherein the outer hollow portion includes a protrusion portion that protrudes to the vehicle width direction inner side of the reaction force face, and the protrusion portion is arranged on the rear side of the inner side wall portion of the main body frame, which is formed in an L shape in a cross-sectional view in the vehicle width direction.

10. A vehicle seat comprising:
a seat back comprising a movable portion that supports an occupant, and that moves in a vehicle width direction with respect to a main body frame due to a load in a seat width direction;
a hard resin material that is provided at a left and right pair of side portions of the seat back, and that is capable of crushing deformation at a time of a vehicle side impact; and
a seat cover that covers a surface of the hard resin material;
a side airbag device comprising a side airbag that inflates and deploys at the time of a vehicle side impact and accommodated at an interior of one or both of the side portions of the seat back; wherein
at least a rear side of the side airbag device is covered by the hard resin material;

the hard resin material is configured from a single resin-formed portion positioned at an occupant side of the side airbag device; and a tear portion, at which a front end portion of the seat cover covering the resin-formed portion and a front end portion of the seat cover covering the side airbag device overlap with each other and are sewn together, is provided at a seat front-rear direction front side portion of the resin-formed portion.

11. A vehicle seat comprising:

a seat back comprising a movable portion that supports an occupant, and that moves in a vehicle width direction with respect to a main body frame due to a load in a seat width direction;

a hard resin material that is provided at a left and right pair of side portions of the seat back, and that is capable of crushing deformation at a time of a vehicle side impact; and a seat cover that covers a surface of the hard resin material;

a side airbag device comprising a side airbag that inflates and deploys at the time of a vehicle side impact and accommodated at an interior of one or both of the side portions of the seat back; wherein at least a rear side of the side airbag device is covered by the hard resin material, and the side airbag device and the hard resin material are pre-configured as a module a stud bolt attached to the side airbag device being inserted through an attachment hole that is formed at the hard resin material and by front end portions of the seat cover covering the hard resin material being sewn together.

* * * * *